(No Model.)
L. O. KEIL.
BADGE.
No. 464,365.
Patented Dec. 1, 1891.
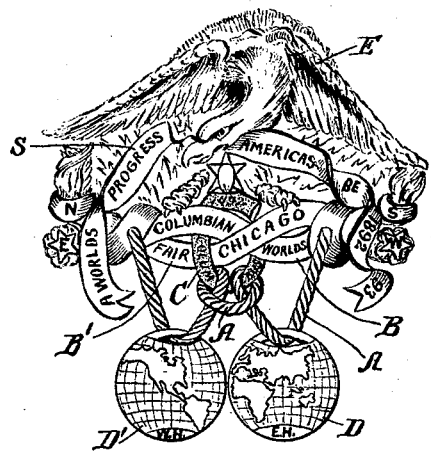
WITNESSES:
Fred G. Dieterich
Edw. W. Byrn.
INVENTOR:
Louis O. Keil.
BY
ATTORNEYS

UNITED STATES PATENT OFFICE.

LOUIS O. KEIL, OF BIRMINGHAM, ALABAMA.

BADGE.

SPECIFICATION forming part of Letters Patent No. 464,365, dated December 1, 1891.

Application filed April 15, 1891. Serial No. 388,968. (No model.)

*To all whom it may concern:*

Be it known that I, LOUIS O. KEIL, of Birmingham, in the county of Jefferson and State of Alabama, have invented a new and useful Improvement in Badges, of which the following is a specification.

The object of my invention is to provide an attractive badge for the Columbian World's Fair of 1892-93; and to this end it consists in the peculiar construction and arrangement of parts hereinafter shown and described.

The drawing is a front view of the badge.

Said badge may be made of metal, embossed paper, celluloid, or any other desired material, and is constructed as follows: A spread-eagle E is at the top, carrying in his beak a scroll S bearing the words "A World's Progress Americas Be, 1892-3." Beneath his feet are two intertwisted bars B B', having upon their ends a torch and stars and bearing the letters "N., E.," and "S., W.," indicating the sections North, East, South, and West. The bar B bears the words "Columbian World's" and the bar B' bears the words "Fair, Chicago." An initial letter "C" inscribed with "1492," "Columbus" is intertwisted with the bars B B' in the center. Upon the flattened upper end of this letter "C" is an egg on its end with a star in the rear. Hung from the bars B B' and the letter "C" is a suspending cable, cord, or ribbon A, which is looped like the letter W, and has in each of its lower bends a disk or globe D and D' with delineations thereupon to represent the eastern and western hemispheres and marked, respectively, "E. H." and "W. H." The peculiar looping of the cord and method of suspending the disk may be utilized as a mechanical puzzle, in which the object is to get both the globes or disks on the same loop and restore them to their original position again; but the two disks may, if desired, simply form the constructive features of pendants to the badge.

Having thus described my invention, what I claim as new is—

1. A badge composed of a spread-eagle surmounting intertwisted bars, the pendent flexible cord or ribbon A, and the two disks representing the eastern and western hemispheres, supported loosely in the loops of the cord, substantially as shown and described.

2. A badge composed of a spread-eagle with scroll S in his bill, the subjacent intertwisted bars B B' with torches and stars and letter "C," the W-shaped cord or ribbon A, the disks D D', suspended in the loops of the latter, and the egg and star located above the letter "C," substantially as shown and described.

LOUIS O. KEIL.

Witnesses:
 BENJAMIN T. COWHERD,
 WALTER Z. TURNER.